(12) United States Patent
Moon et al.

(10) Patent No.: US 9,806,652 B2
(45) Date of Patent: Oct. 31, 2017

(54) SYSTEM OF CONTROLLING INDUCTION ELECTRIC MOTOR

(71) Applicant: LSIS CO., LTD., Gyeonggi-do (KR)

(72) Inventors: Joo-Young Moon, Gyeonggi-do (KR); Hak-Jun Lee, Gyeonggi-do (KR); Anno Yoo, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/164,152

(22) Filed: May 25, 2016

(65) Prior Publication Data
US 2016/0352274 A1 Dec. 1, 2016

(30) Foreign Application Priority Data

May 26, 2015 (KR) .................. 10-2015-0072952

(51) Int. Cl.
*H02P 21/00* (2016.01)
*H02P 23/00* (2016.01)
(Continued)

(52) U.S. Cl.
CPC .......... *H02P 21/0089* (2013.01); *H02P 21/00* (2013.01); *H02P 21/22* (2016.02);
(Continued)

(58) Field of Classification Search
CPC .... H02P 21/0035; H02P 21/06; H02P 21/146; H02P 2207/05; H02P 21/0089; H02P 21/0017
(Continued)

(56) References Cited

U.S. PATENT DOCUMENTS 6,611,124 B2 * 8/2003 Ishida .................. H02P 21/16
318/727
7,095,208 B2 * 8/2006 Kawaji .................. H02P 27/08
318/438
(Continued)

FOREIGN PATENT DOCUMENTS

JP  6-105581 A  4/1994
JP  2001-8500 A  1/2001
(Continued)

OTHER PUBLICATIONS

Search report dated Dec. 15, 2016 for related EP patent application 16169262.9.

*Primary Examiner* — Rina Duda
(74) *Attorney, Agent, or Firm* — Nath, Goldberg & Meyer; Jerald L. Meyer

(57) ABSTRACT

In some embodiments, a system of controlling an induction electric motor, includes a command voltage output unit for generating a command voltage for operating an inverter according to a command speed and outputting the generated command voltage to the inverter; a control unit for controlling the command voltage output unit such that the command voltage output to the inverter is compared with an operation limiting voltage and the command voltage is corrected to fall within the operation limiting voltage; and the inverter for controlling the induction electric motor depending on the corrected command voltage. Thus, it is possible to precisely control the induction electric motor even in a high speed operation region by regulating the magnitude of the command voltage applied to the induction electric motor by means of dynamic modulation strategies without the magnetic flux controller.

5 Claims, 6 Drawing Sheets

(51) Int. Cl.
*H02P 21/22* (2016.01)
*H02P 21/26* (2016.01)
*H02P 27/08* (2006.01)

(52) U.S. Cl.
CPC .......... *H02P 21/26* (2016.02); *H02P 23/0086* (2013.01); *H02P 27/08* (2013.01)

(58) Field of Classification Search
USPC .................................... 318/400.02, 797, 801
See application file for complete search history.

(56) References Cited

U.S. PATENT DOCUMENTS

| | | | | |
|---|---|---|---|---|
| 7,944,163 | B2* | 5/2011 | Okumura | ................ H02P 6/16 318/400.01 |
| 8,362,759 | B2* | 1/2013 | Ha | .................. H02M 7/53875 318/729 |
| 2004/0228151 | A1 | 11/2004 | Matsushiro et al. | |
| 2008/0297097 | A1* | 12/2008 | Lee | .................... H02P 21/0089 318/701 |
| 2010/0060211 | A1 | 3/2010 | Hashimoto et al. | |
| 2012/0268046 | A1* | 10/2012 | Yamazaki | ............. H02P 21/146 318/400.02 |
| 2013/0009575 | A1 | 1/2013 | Yoo | |
| 2014/0300309 | A1* | 10/2014 | Yoo | .................... H02P 21/0017 318/801 |
| 2015/0155815 | A1 | 6/2015 | Yoo | |

FOREIGN PATENT DOCUMENTS

| | | |
|---|---|---|
| JP | 2001186789 A | 7/2001 |
| JP | 03/009463 A1 | 1/2003 |
| JP | 2003009598 A | 1/2003 |
| JP | 2003284384 A | 10/2003 |
| KR | 10-1991-0016605 A | 11/1991 |
| KR | 10-1993-0005331 A | 3/1993 |
| KR | 10-2000-0043846 A | 7/2000 |
| KR | 10-2006-0121135 A | 11/2006 |
| KR | 10-2008-0019131 A | 3/2008 |
| KR | 10-2011-0008666 A | 1/2011 |
| KR | 10-2012-0058905 A | 6/2012 |
| KR | 10-2015-0062562 A | 6/2015 |

* cited by examiner

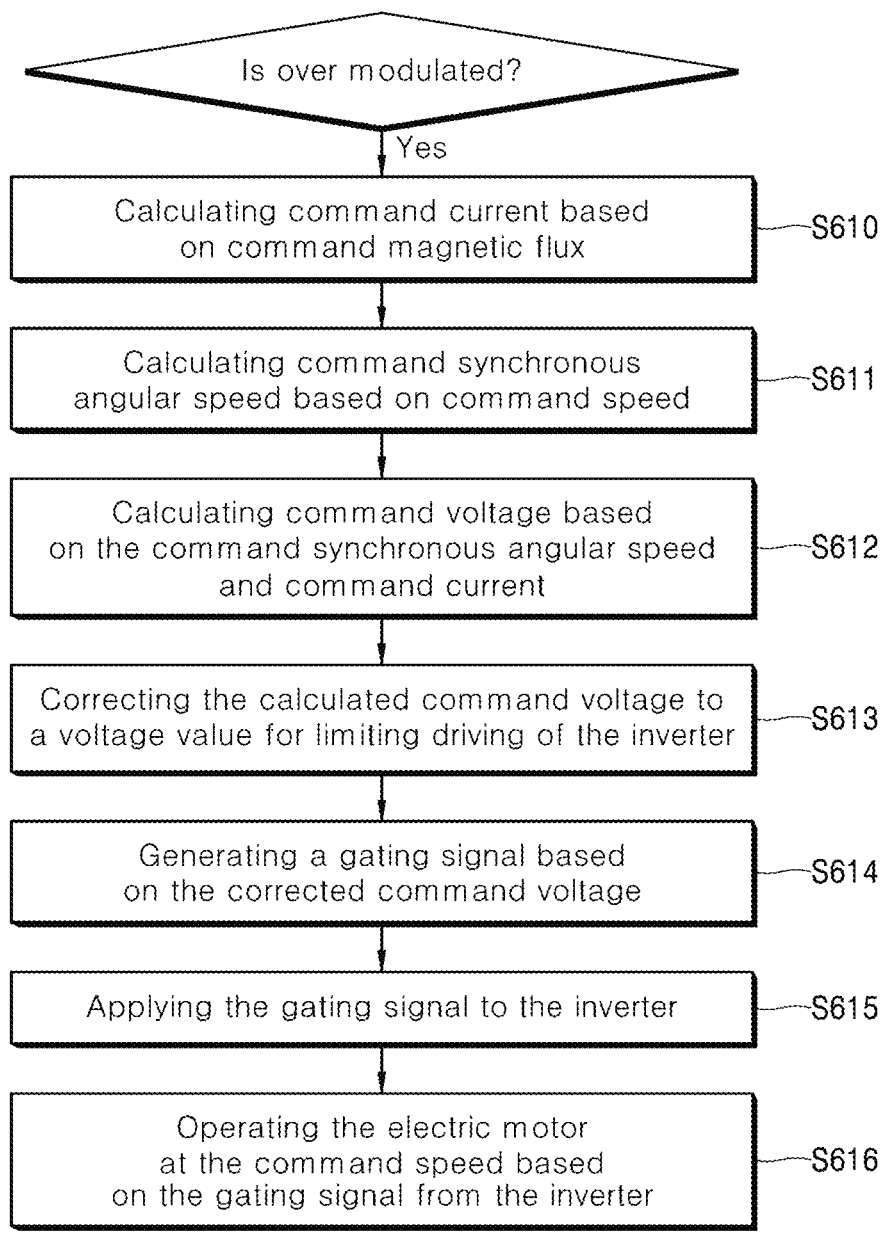

SYSTEM OF CONTROLLING INDUCTION ELECTRIC MOTOR

CROSS REFERENCE TO RELATED APPLICATION

This application claims the benefit of Korean Patent Application No. 10-2015-0072952, filed on May 26, 2015, entitled "SYSTEM OF CONTROLLING INDUCTION ELECTRIC MOTOR", which is hereby incorporated by reference in its entirety.

BACKGROUND

1. Technical Field

The present disclosure relates to a system of controlling an induction electric motor, and more particularly, to a system of controlling an induction electric motor for controlling an induction electric motor in a high speed region.

2. Description of the Related Art

Capability of operating an electric motor at high speed is required in various industrial fields including the field of electric motors such as fans, pumps, blowers, electric automobiles, electric rail cars and the like.

Among electric motors in various fields, in order to operate the induction electric motor in a high speed region above a preset rated speed, flux weakening control, i.e., operating the electric motor by reducing magnetic flux of a rotor of the electric motor is necessary.

Typically, output voltage of the induction electric motor increases with the speed of the induction electric motor.

The flux weakening control is a technique capable of controlling the electric motor in a high speed region by appropriately regulating output voltage (i.e., counter electromotive force) that increases with the speed of electric motor and then controlling the electric motor, and in turn securing voltage margin that can be synthesized in an inverter.

More specifically, the flux weakening control means a method of reducing magnetic flux of the rotor when an output voltage value is above a preset rated voltage.

In case of AC electric motors among induction electric motors, at the time of vector control (or filed oriented control) based on magnetic flux of the rotor using a flux controller, counter electromotive force is restricted by reducing electric current of magnetic flux component in flux weakening operation range.

This flux weakening control based on control of electric current has problems in that its structure is complicated and dynamic characteristics vary depending on selection of gain of the flux controller.

FIG. 1 is a block diagram showing configuration of a system of controlling an induction electric motor according to the prior art.

Referring to FIG. 1, three phase AC power which is output from an AC power supply 102 is converted into DC power through a diode 103, and the converted DC power is filtered through a filter and then applied to a PWM inverter 104. The DC power applied to the PWM inverter 104 is converted into AC power depending on a gating signal which is output from a magnetic flux controller 106 and a vector control system 107, and then it is delivered to an induction electric motor 105.

FIG. 2 is a diagram showing a magnetic flux controller for generating magnetic flux in the system of controlling the induction electric motor according to the prior art.

When vector control is performed by the magnetic flux controller 106 in FIG. 2, equation for d-axis magnetic flux of the rotor in the coordinate system rotating at synchronous speed is as follows:

$$\frac{d\lambda_{dre}}{dt} = R_r \frac{L_m}{L_r} i_{dse} - \frac{R_r}{L_r} \lambda_{dre} \quad \text{[Equation 1]}$$

Equation 1 is an equation for d-axis magnetic flux of the rotor in the coordinate system rotating at synchronous speed when vector control is performed. In Equation 1, $\lambda_{dre}$ indicates d-axis magnetic flux of the rotor, Lm indicates magnetizing inductance, $L_r$ indicates inductance of the rotor, and $R_r$ indicates resistance of the rotor.

Referring to FIG. 2, the magnetic flux controller 106 receives d-axis magnetic flux command, $\lambda_{dre}*$ and magnetic flux, $\lambda_{dre}$ of the synchronous coordinate system. A current control unit 203 performs a proportional integral according to formula shown in FIG. 2 by using the received d-axis magnetic flux command, $\lambda_{dre}*$ and the magnetic flux, $\lambda_{dre}$. Feed forward unit 202 feeds forward a change portion of the magnetic flux $\lambda_{dre}$ according to formula shown in FIG. 2.

Command current, $i_{dse}*$ generated by the current control unit 203 and the feed forward unit 202 is converted to magnetic flux $\lambda_{dre}$ through proportional integral by means of a magnetic flux generating unit 204. The magnetic flux converted by the magnetic flux generating unit 204 is delivered to the vector control system 107.

In FIG. 2, "S" stands for Laplace operator, that is, a differential operation. In other words, the current control unit 203 performs integral operation denoted by "1/S" by using a proportional gain, $K_p$ and an integral gain, $K_i$. Then, the magnetic flux generating unit 204 performs a differential operation indicated as "S".

The vector control system 107 generates a gating signal based on the converted magnetic flux, $\lambda_{dre}$ and applies it to the PWM inverter 104.

As such, the conventional magnetic flux controller 106 has problems in that since it includes a differential operation and an integral operation, which are relatively complex operation process, there is a limitation to improve performance of operation speed due to such complex and excessive operation. In particular, since the existing magnetic flux controller 106 performs an integral operation by using a proportional gain, $K_p$ and an integral gain, $K_i$, there is a problem that the performance fluctuates greatly depending on the proportional gain, $K_p$ and integral gain, $K_i$.

That is, there is a problem that the larger the proportional gain, $K_p$ and the integral gain, $K_i$, the faster the operation speed due to reduction of the number of operations, but the larger the error.

On the other hand, there is also a problem that the smaller the proportional gain, $K_p$ and the integral gain, $K_i$, the smaller the error, but the slower the operation speed due to increase of the number of operations.

Further, it is possibly not to prevent increase in output voltage of the electric motor properly due to error of the magnetic flux controller 106, or otherwise it is possibly for the gating signal not to be supplied properly due to slow operation speed of the magnetic flux controller 106. As a result, there is a problem that control on the induction electric motor 105 by a system becomes unstable depending on the gains $K_p$ and $K_i$ of the magnetic flux controller 106.

SUMMARY

It is an aspect of some embodiments of the present disclosure is to provide a system of controlling an induction electric motor capable of performing flux weakening control without a flux controller in a high speed operation region under which the electric motor runs at a speed above a preset rated speed.

The present disclosure is not limited to the above aspect and other aspects of the present disclosure will be clearly understood by those skilled in the art from the following description. Other objects and advantages of the present disclosure that are not mentioned herein will be understood by the following description. In addition, it will be appreciated clearly that objects and advantages of the present disclosure can be implemented by means set forth in the appended patent claims and combinations thereof.

In accordance with one aspect of the present disclosure for accomplishing objects as above, some embodiments of the present disclosure provide a system of controlling an induction electric motor, comprising an input unit for receiving a command speed for operating the induction electric motor at a high speed above a preset speed; a command voltage output unit for generating a command voltage for operating an inverter based on the received command speed and outputting the generated command voltage to the inverter; a control unit for controlling the command voltage output unit such that the command voltage output to the inverter is compared with a preset operation limiting voltage and the generated command voltage is corrected to fall within the preset operation limiting voltage, depending on a result of the comparison; and the inverter for controlling the induction electric motor at a high speed depending on the corrected command voltage.

BRIEF DESCRIPTION OF DRAWINGS

FIG. 7 is a flowchart showing a method of controlling an induction electric motor according to a preferred embodiment of the present disclosure.

DETAILED DESCRIPTION

Figure 1:
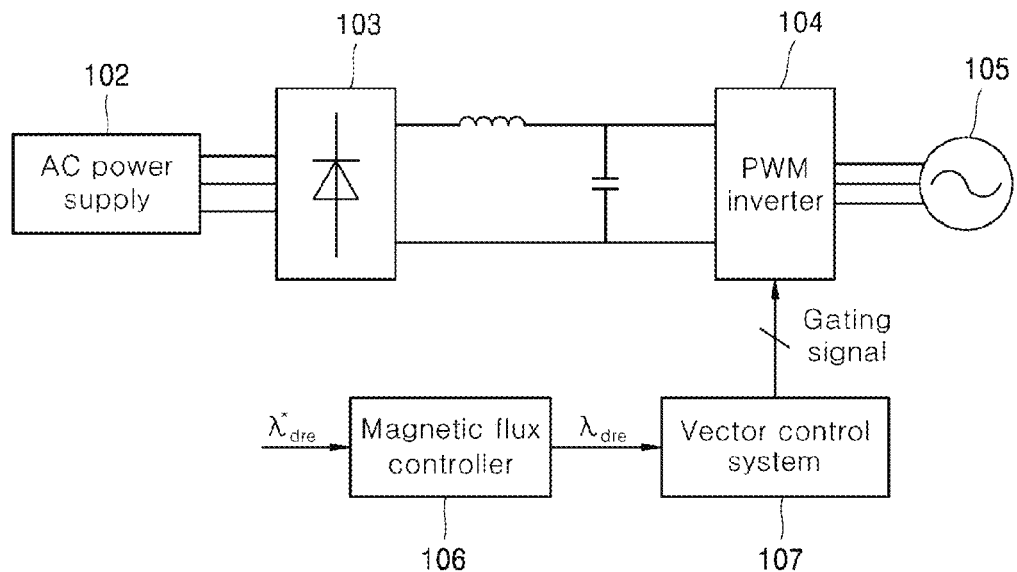
FIG. 1 is a block diagram showing configuration of a system of controlling an induction electric motor according to the prior art.
Figure 2:
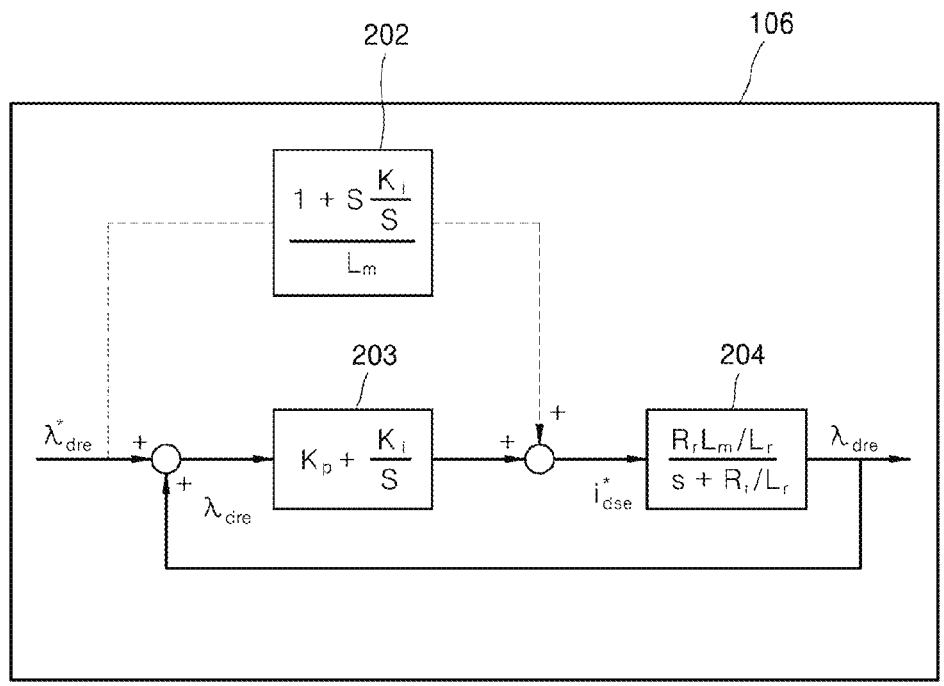
FIG. 2 is a diagram showing a magnetic flux controller for generating magnetic flux in the system of controlling the induction electric motor according to the prior art.

Hereinafter, embodiments of the present disclosure will be described in detail with reference to the accompanying drawings. It should be understood that the present disclosure is not limited to the following embodiments, and that the embodiments are provided for illustrative purposes only. The scope of the disclosure should be defined only by the accompanying claims and equivalents thereof.

The objects, features and advantages of the present disclosure as described above will be described in detail with reference to the accompanying drawings and thus, technical idea of the present disclosure can be easily implemented from a reading of the following detailed description by those skilled in the art.

In describing the present disclosure, if it is considered that detailed descriptions about well-known techniques related to the present disclosure unnecessarily obscure the gist of the present disclosure, such detailed descriptions are omitted.

Preferred embodiments of the present disclosure will now be described in detail with reference to the accompanying drawings. In drawings, same reference numerals are used to indicate same or similar elements.

Hereinafter, configuration of a system of controlling an induction electric motor and a method of controlling an induction electric motor, according to an embodiment of the present disclosure will be described in detail with reference to FIGS. 3 to 7.

Figure 3:
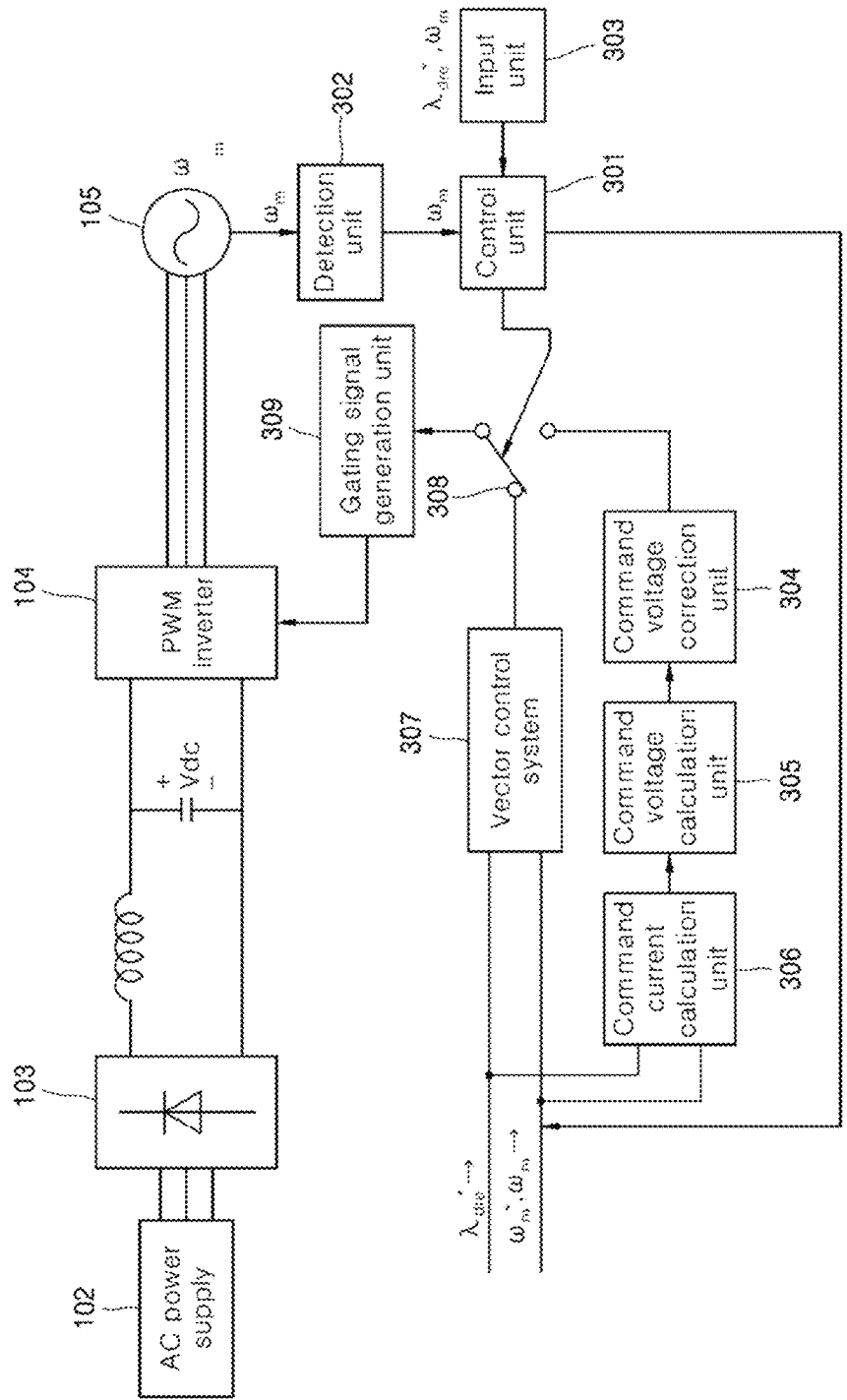
FIG. 3 is a block diagram showing configuration of a system of controlling an induction electric motor according to an embodiment of the present disclosure.

FIG. 3 is a block diagram showing configuration of a system of controlling an induction electric motor according to an embodiment of the present disclosure.

Referring to FIG. 3, a system of controlling an induction electric motor comprises: an AC power supply 102, a diode rectifying unit 103, a PWM inverter 104, a detection unit 302, a control unit 301, an input unit 303, a command current calculation unit 306, a command voltage calculation unit 305, a command voltage correction unit 304, a vector control system 307, an operation switching unit 308, and a gating signal generation unit 309.

The AC power supply 102 can output three phase AC power to the induction electric motor 105.

The diode rectifying unit 103 converts the three phase AC power output from the AC power supply 102 into DC power, and outputs the converted DC power to the PWM inverter 104. The converted DC power is filtered through an inductor and a capacitor provided at an input terminal of the PWM inverter 104, and then stored in the capacitor at the input terminal of the PWM inverter 104 as DC power, $V_{dc}$.

The PWM inverter 104 receives a gating signal that is generated by the gating signal generation unit 309, converts the DC power into AC power depending on the received gating signal, and outputs the converted AC power to the induction electric motor 105.

The induction electric motor 105 may be operated in accordance with the AC power output.

The detection unit 302 can detect a command torque, $T_e^*$ and an output speed, $W_m$ of the induction electric motor 105. When the output speed is detected, the detection unit 302 may transmit information about the detected command torque and output speed to the control unit 301.

The input unit 303 may receive a command magnetic flux, $\lambda_{dre}^*$ and a command speed, $W_m^*$ from the outside and transmit the received magnetic flux and command speed to the control unit 301.

The control unit 301 may detect a command voltage which is applied to the gating signal generation unit 309. The control unit 301 may control the operation switching unit 308 based on the detected command voltage and select a new command voltage required for generating a gating signal depending on a preset condition. In a preferred embodiment of the present disclosure, the control unit 301 may select, on the basis of the command voltage, any one of the vector control system 307 and the command voltage correction unit 304 as an input means to which an output voltage to be applied to the gating signal generation unit 309 is applied according to the preset condition.

The system of controlling an induction electric motor according to a preferred embodiment of the present disclosure can generate the command voltage through the input means which is selected from the vector control system 307 and the command voltage correction unit 304 by the control unit 301 according to the preset condition, and transmit the generated command voltage to the gating signal generation unit 309. More specifically, the control unit 301 may detect the command voltage to be applied to the gating signal generation unit 309 and determine whether or not the preset condition is satisfied based on the detected command voltage.

Examples of the preset condition may include as to whether the command voltage is over modulated. More specifically, the control unit 301 determines whether the detected command voltage is less than or equal to a voltage value for limiting operation of the inverter that is a voltage value for operating the inverter, and selects a means for generating a command voltage depending on the result of the determination.

When the command voltage detected by the control unit 301 is less than a preset voltage value for limiting operation of the inverter, the control unit 301 may select the vector control system 307 as a means for generating the command voltage. When the vector control system 307 is selected as the means for generating command voltage, the system of controlling induction electric motor generates the command voltage through the vector control system 307, and applies the generated command voltage to the gating signal generation unit 309.

When the detected command voltage is greater than the preset voltage value for limiting operation of the inverter, the control unit 301 may select the command voltage output unit as a means for generating the command voltage. The command voltage output unit may include the command voltage correction unit 304, the command voltage generation unit 305, and the command current calculation unit 306 as shown in FIG. 3. The control unit 301 may select the command current calculation unit 306, the command voltage generation unit 305, and the command voltage correction unit 304 as a means for generating and correcting the command voltage. When the command current calculation unit 306, the command voltage generation unit 305, and the command voltage correction unit 304 are selected as a means for generating and correcting the command voltage, the system of controlling induction electric motor can generate the command voltage through the command current calculation unit 306, the command voltage generation unit 305, and the command voltage correction unit 304, and apply it to the gating signal generation unit 309.

In addition, the control unit 301 can transmit the received command magnetic flux, the command speed, and the detected torque command and output speed to the command current calculation unit 306 or the vector control system 307.

The command current calculation unit 306 may calculate a command current based on the received magnetic flux, command speed, command torque and output speed. The command current calculation unit 306 can transmit the calculated command current to the command voltage calculation unit 305.

The command voltage calculation unit 305 can generate the command voltage based on the command current received. The command voltage calculation unit 305 can output the generated command voltage to the command voltage correction unit 304.

The command voltage correction unit 304 can correct the command voltage received to a certain amount of voltage based on the preset voltage condition. More specifically, the command voltage correction unit 304 can correct the command voltage received to a voltage less than or equal to a rated voltage. That is, the command voltage correction unit 304 can correct the command voltage which is generated and transmitted through the command voltage calculation unit 305 to a voltage of a range that can be received and controlled by the gating signal generation unit 309 and the PWM inverter 104.

The gating signal generation unit 309 can generate a gating signal that forces the PWM inverter 104 to drive, based on the command voltage generated by the selection of the control unit 301. The gating signal generation unit 309 may transmit the generated gating signal to the PWM inverter 104.

The PWM inverter 104 may be driven in accordance with the gating signal received. In addition, the PWM inverter 104 may control speed, Wm of the induction electric motor 105 by using the gating signal received and DC power being transmitted.

Hereinafter, configuration and operation of the command current calculation unit, the command voltage calculation unit and the command voltage correction unit will be described in detail with reference to FIG. 4.

Figure 4:
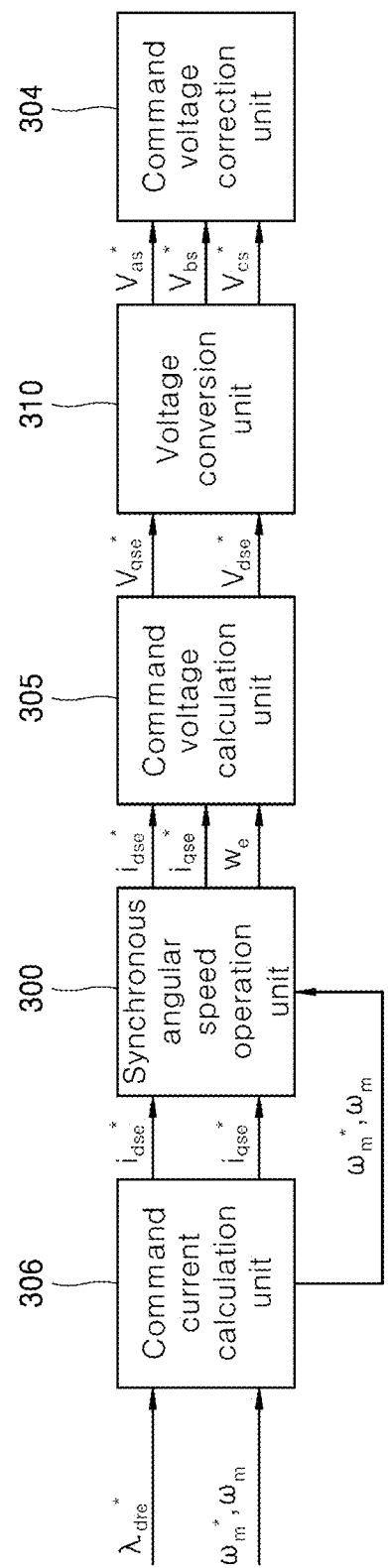
FIG. 4 is a block diagram showing configuration of a system of controlling an induction electric motor according to a preferred embodiment of the present disclosure.

FIG. 4 is a block diagram showing configuration of a system of controlling an induction electric motor according to a preferred embodiment of the present disclosure.

If it is determined that the command voltage to be applied to the gating signal generation unit 309 in FIG. 3 is greater than the preset voltage value for limiting driving of the inverter, the control unit 301 may select the means for generating the command voltage as the command voltage correction unit 304 in FIG. 3 through the operation switching unit 308 in FIG. 3, wherein a method of generating the command voltage through the command voltage correction unit 304 is a method of generating the command voltage that will be described with reference to FIG. 4.

The command current calculation unit 306 may calculate a command current based on the command torque, the command magnetic flux, the command speed, and the output speed. More specifically, the command current calculation unit 306 may generate a command current of a q-axis stator, $i_{qse}^*$ and a command current of a d-axis stator, $i_{dse}^*$ in the synchronous coordinate system based on the command torque, $T_e^*$ of the induction electric motor 105 in FIG. 3, which is transmitted from the control unit 301 in FIG. 3, the command magnetic flux of the d-axis stator, $i_{dse}^*$ in the synchronous coordinate system, the command speed and the output speed, and outputs the generated command current of the q-axis stator and command current of the d-axis stator to the command voltage calculation unit 305.

More specifically, the command current calculation unit 306 may calculate the command current of the d-axis stator by dividing the transmitted command magnetic flux, $\lambda_{dre}^*$ by a magnetizing inductance, $L_m$ (e.g., $i_{dse}^* = \lambda_{dre}^*/L_m$). Further, the command current calculation unit 306 may calculate the command current of the q-axis stator based on the transmitted command magnetic flux, $\lambda_{dre}^*$, the command torque, $T_e^*$, the magnetizing inductance, $L_m$, an inductance of the rotor, $L_r$, and a proportional constant, P (e.g., $i_{qse}^* = T_e^*/(3/2 \times P/2 \times L_m/L_r \times \lambda_{dre}^*)$).

The command current calculation unit 306 may transmit the calculated command current of the d-axis stator, $i_{dse}^*$ and the calculated command current of the q-axis stator, $i_{qse}^*$ to the command voltage calculation unit 305 via a synchronous angular velocity operation unit 300. Further, the command current calculation unit 306 may also transmit the command speed, $W_m^*$ and the output speed, $W_m$, which are transmitted from the control unit 301 in FIG. 3 to the synchronous angular velocity operation unit 300.

When the command speed, $W_m^*$ and the output speed, $W_m$ are transmitted, the synchronous angular velocity operation unit 300 may operate an output angular velocity, $W_e$ for calculating the command voltage, based on the transmitted command speed, $W_m^*$ and output speed, $W_m$. The synchronous angular velocity operation unit 300 may transmit the operated output angular speed, $W_e$ and the transmitted command current of the d-axis stator, $i_{dse}^*$ and command current of the q-axis stator, $i_{qse}^*$ to the command voltage calculation unit 305.

The command voltage calculation unit 305 may calculate a command voltage for outputting to the gating signal generation unit 309 in FIG. 3 based on the transmitted output angular speed, $W_e$, command current of the d-axis stator, $i_{dse}^*$ and command current of the q-axis stator, $i_{qse}^*$. More specifically, the command voltage calculation unit 305 may calculate a command voltage of the d-axis stator based on the output angular velocity, $W_e$ and the command current of the q-axis stator, $i_{qse}^*$ (e.g., $V_{dse}^* = W_e \times A \times L_s \times i_{qse}^*$, where A is the electrical conductivity of the induction electric motor and $L_s$ is the inductance of the stator). Further, the command voltage calculation unit 305 may calculate a command voltage of the q-axis stator based on the output angular velocity, $W_e$ and the command current of the d-axis stator, $i_{dse}^*$ (e.g., $V_{qse}^* = W_e \times L_s \times i_{dse}^*$). The command voltage calculation unit 305 may transmit the calculated command voltage of the q-axis stator, $V_{qse}^*$ and command voltage of the d-axis stator, $V_{dse}^*$ to the command voltage correction unit 304 via a voltage conversion unit 310.

The voltage conversion unit 310 may convert each of the transmitted command voltages, $V_{qse}^*$ and $V_{dse}^*$ of the synchronous coordinate system to three phase command voltages, $V_{as}^*$, $V_{bs}^*$ and $V_{cs}^*$ for controlling the PWM inverter 104 in FIG. 3. The voltage conversion unit 310 may transmit the converted three phase command voltages $V_{as}^*$, $V_{bs}^*$ and $V_{cs}^*$ to the command voltage correction unit 304.

The command voltage correction unit 304 may correct the received three phase command voltages $V_{as}^*$, $V_{bs}^*$ and $V_{cs}^*$ according to the preset condition.

Hereinafter, a method of correcting the three phase command voltage in line with dynamic over modulation strategies through the command voltage correction unit will be described in detail with reference to FIG. 5.

Figure 5:
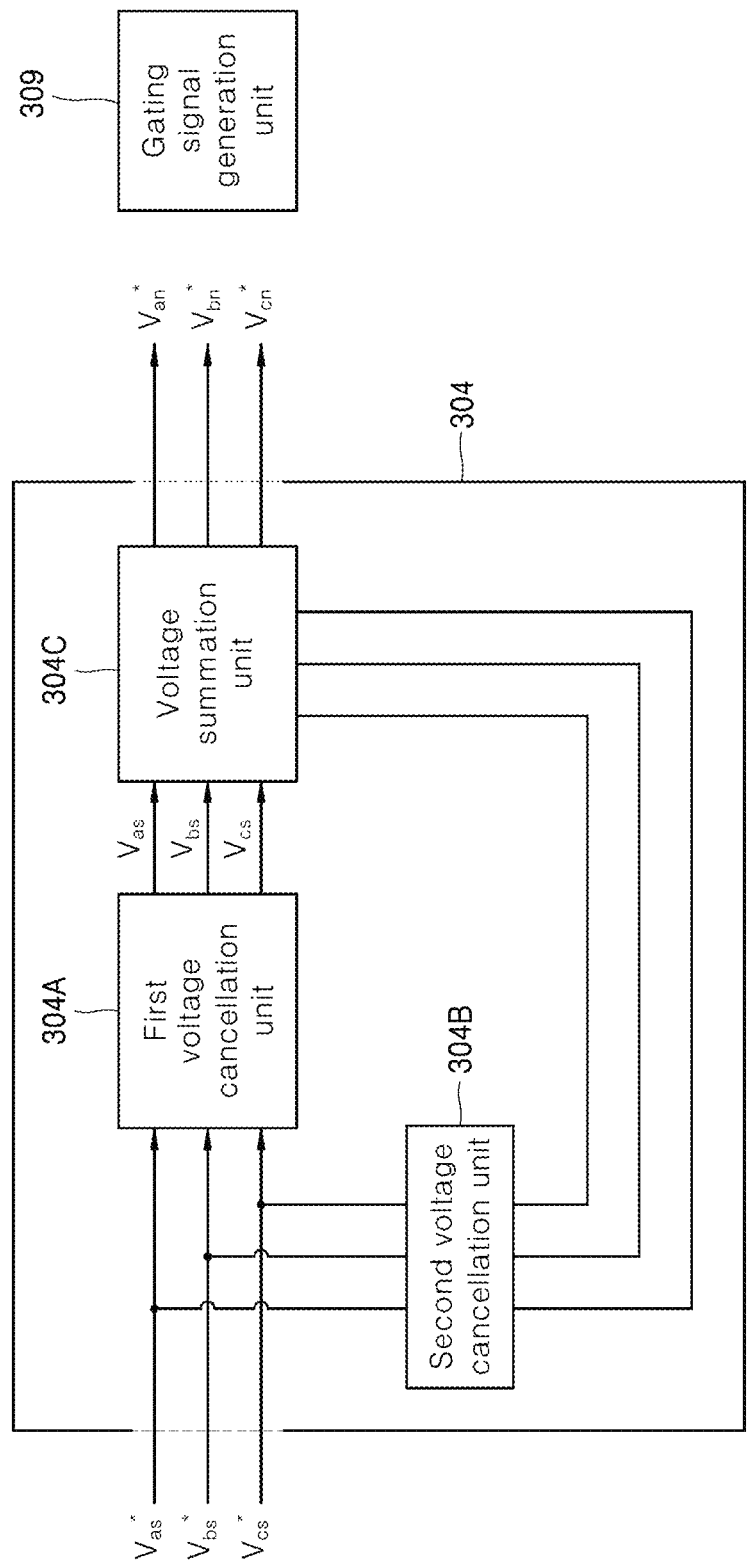
FIG. 5 is a block diagram showing configuration of a command voltage correction unit according to a preferred embodiment of the present disclosure.

FIG. 5 is a block diagram showing configuration of a command voltage correction unit according to a preferred embodiment of the present disclosure.

Referring to FIG. 5, the command voltage correction unit 304 in FIG. 4 may include a first voltage cancellation unit 304A, a second voltage cancellation unit 304B and a voltage summation unit 304C.

The command voltage correction unit 304 may correct the magnitude of the command voltage calculated through the command voltage calculation unit 305 in FIG. 4 to a voltage value equal to or less than a driving limitation voltage value for driving the PWM inverter 104 in FIG. 3. More specifically, the command voltage correction unit 304 may convert the three phase command voltage to an offset voltage based on the magnitude of the calculated command voltage. The offset voltage converted as above becomes a voltage of a range that can be received and controlled by the gating signal generation unit 309 and the PWM inverter 104, e.g., the corrected command voltage.

More specifically, when the three phase command voltages converted through the voltage conversion unit 310, $V_{as}^*$, $V_{bs}^*$ and $V_{cs}^*$ are transmitted, the first voltage cancellation unit 304A may calculate: a first A-phase cancellation command voltage (e.g., $V_{as}^* \times V_{dc}/(V_{max}-V_{min})$); a first B-phase cancellation command voltage (e.g., $V_{bs}^* \times V_{dc}/(V_{max}-V_{min})$); and a first C-phase cancellation command voltage (e.g., $V_{cs}^* \times V_{dc}/(V_{max}-V_{min})$), based on the three phase command voltages $V_{as}^*$, $V_{bs}^*$ and $V_{cs}^*$, wherein each of the cancellation command voltages is obtained by multiplying each of the three phase command voltages $V_{as}^*$, $V_{bs}^*$ and $V_{cs}^*$ by a first cancellation voltage value (e.g., $V_{dc}/(V_{max}-V_{min})$) which is obtained by dividing the preset reference voltage (e.g., voltage of the input terminal of the PWM inverter in FIG. 3, $V_{dc}$) by a value (e.g., $V_{max}-V_{min}$) obtained by subtracting the minimum voltage value (e.g., $V_{min}$) from the maximum voltage value (e.g., $V_{max}$) among the three phase command voltages $V_{as}^*$, $V_{bs}^*$ and $V_{cs}^*$.

Further, the second voltage cancellation unit 304B may calculate: a second A-phase cancellation command voltage (e.g., $V_{as}^* \times -V_{dc}/2 \times (V_{max}+V_{min})/(V_{max}-V_{min})$); a second B-phase cancellation command voltage (e.g., $V_{bs}^* \times -V_{dc}/2 \times (V_{max}+V_{min})/(V_{max}-V_{min})$); and second C-phase cancellation command voltage (e.g., $V_{cs}^* \times -V_{dc}/2 \times (V_{max}+V_{min})/(V_{max}-V_{min})$), based on the three phase command voltages $V_{as}^*$, $V_{bs}^*$ and $V_{cs}^*$ transmitted, wherein each of the cancellation command voltages is obtained by multiplying each of the three phase command voltages $V_{as}^*$, $V_{bs}^*$ and $V_{cs}^*$ by a second cancellation voltage value (e.g., $-V_{dc}/2 \times (V_{max}+V_{min})/(V_{max}-V_{min})$), where the second cancellation voltage value is obtained by multiplying a value (e.g., $-V_{dc}/2$), which is obtained by dividing the preset reference voltage (e.g., $V_{dc}$) by −2, by a value (e.g., $V_{max}+V_{min}$) obtained by adding the minimum voltage value (e.g., $V_{min}$) to the maximum voltage value (e.g., $V_{max}$), and then dividing the result by a value (e.g., $V_{max}-V_{min}$) obtained by subtracting the minimum voltage value (e.g., $V_{min}$) from the maximum voltage value (e.g., $V_{max}$).

The first voltage cancellation unit 304A may transmit the calculated first A-phase, B-phase and C-phase cancellation command voltages to the voltage summation unit 304C. Further, the second voltage cancellation unit 304B may transmit the calculated second A-phase, B-phase and C-phase cancellation command voltages to the voltage summation unit 304C.

When the first and second A-phase cancellation command voltages, the first and second B-phase cancellation command voltages, and the first and second C-phase cancellation command voltages are transmitted, the voltage summation unit 304C may calculate a final A-phase cancellation command voltage (e.g., $V_{an}^* = V_{as}^* \times V_{dc}/(V_{max}-V_{min}) + V_{as}^* \times -V_{dc}/2 \times (V_{max}+V_{min})/(V_{max}-V_{min})$), a final B-phase cancellation command voltage (e.g., $V_{bn}^* = V_{bs}^* \times V_{dc}/(V_{max}-V_{min}) + V_{bs}^* \times -V_{dc}/2 \times (V_{max}+V_{min})/(V_{max}-V_{min})$), and a final C-phase cancellation command voltage (e.g., $V_{cn}^* = V_{cs}^* \times V_{dc}/(V_{max}-V_{min}) + V_{cs}^* \times -V_{dc}/2 \times (V_{max}+V_{min})/(V_{max}-V_{min})$), which are obtained respectively by adding the first and second cancellation command voltages of each phase. When the final A-, B- and C-phases cancellation command voltages are calculated, the voltage summation unit 304C may transmit each of the calculated final cancellation command voltages, $V_{an}^*$, $V_{bn}^*$, and $V_{cn}^*$ to the gating signal generation unit 309.

The gating signal generation unit 309 may generate a gating signal for driving the PWM inverter 104 by adding a triangular wave output from a triangular wave generator (not shown) to each of the final cancellation command voltages $V_{an}^*$, $V_{bn}^*$ and $V_{cn}^*$ transmitted, and apply the generated gating signals to the PWM inverter 104.

Hereinafter, control action of a system of controlling an induction electric motor as described with reference to FIGS. 3 to 5 will be described in detail with reference to FIG. 6.

Figure 6:
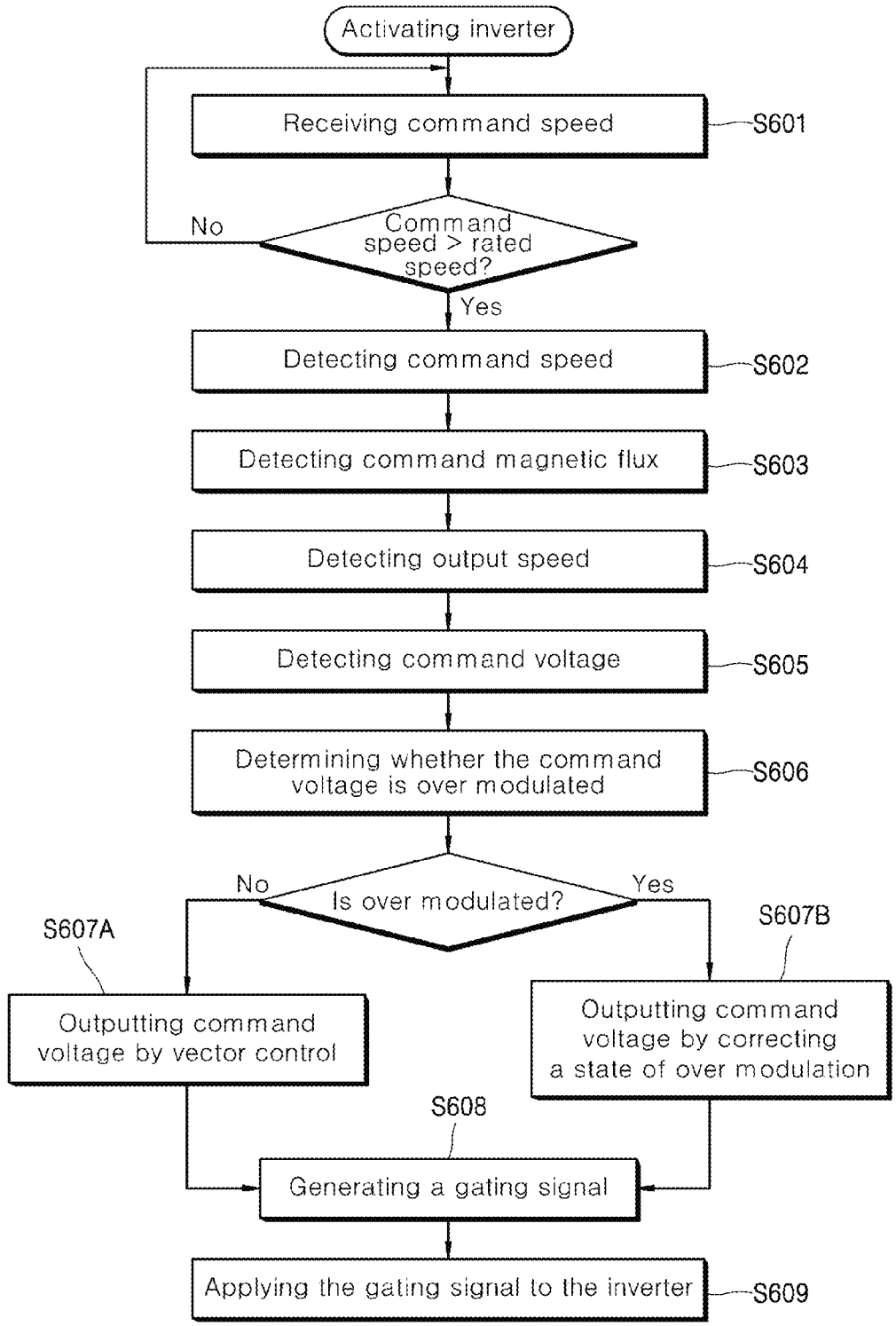
FIG. 6 is a flowchart showing a method of controlling an induction electric motor according to an embodiment of the present disclosure.

FIG. 6 is a flowchart showing a method of controlling an induction electric motor according to an embodiment of the present disclosure.

Referring to FIG. 6, the input unit 303 in FIG. 3 receives a command speed for controlling speed of the induction electric motor 105 from the outside after the PWM inverter 104 in FIG. 3 for controlling the induction electric motor 105 is driven, at S601. When receiving the command speed, the input unit 303 may transmit the received command speed to the control unit 301 in FIG. 3. When the command speed is transmitted from the input unit 303, the control unit 301 may determine whether the received command speed is higher than the preset rated speed (e.g., reference speed for determining whether or not high speed operation is performed). When the received command speed is determined to be lower than the preset rated speed, the control unit 301 may determine the command speed as a command speed for low speed operation. When the received command speed is determined to be higher than or equal to the preset rated speed, the control unit 301 may determine the command speed as a command speed for high speed operation.

When the command speed received through the input unit 303 is determined to be higher than or equal to the preset rated speed, the control unit 301 detects a command speed which is already applied to the PWM inverter 104 at S602, detects a command magnetic flux to be applied to the PWM inverter 104 at S603, detects the current output speed of the induction electric motor 105 through the detection unit 302 in FIG. 4 at S604, and detects a command voltage calculated by the system of controlling the induction electric motor at S605.

The control unit 301 determines as to whether the detected command voltage is over modulated at S606. More specifically, the control unit 301 may determine whether the detected command voltage falls within a range of preset voltage values for limiting driving of the inverter. The control unit 301 may select a means for generating a command voltage corresponding to a new command velocity from the vector control system 307 in FIG. 3 and the command voltage correction unit 304, in line with the result of determining whether or not the detected command voltage falls within the range of preset voltage values for limiting driving of the inverter.

If it is not determined that the command voltage is over modulated, the control unit 301 controls the vector control system 307 such that a command voltage is output according to a vector control method through the vector control system 307 at S607A.

If it is determined that the command voltage is over modulated, the control unit 301 controls the command voltage correction unit 304, not the conventional vector control system 307, and outputs a command voltage obtained by correcting the command voltage calculated already and a state of over modulation to the gating signal generation unit 309 at S607B.

When the command voltage is output, the gating signal generation unit 309 generates a gating signal that forces the PWM inverter to drive, based on the output command voltage at S608.

When the gating signal is generated, the gating signal generation unit 309 apply the generated gating signal to the PWM inverter 104 at S609.

Hereinafter, a method of correcting the state of over modulation of the command voltage shown in FIG. 6 will be described in detail with reference to FIG. 7.

FIG. 7 is a flowchart showing a method of controlling an induction electric motor according to a preferred embodiment of the present disclosure.

When the control unit 301 determines that the command voltage calculated already is under the state of over modulation, the control unit 301 may transmit the command magnetic flux and the command speed to the command current calculation unit 306 in FIG. 3.

When the command magnetic flux and the command speed are transmitted, the command current calculation unit 306 calculates a command current (for example, command current of the d-axis stator and command current of the q-axis stator) based on the command magnetic flux at S610. When the command current is calculated, the command current calculation unit 306 may convert the command speed to a command synchronous angular velocity through the synchronous angular velocity operation unit 300 in FIG. 4 and transmit the converted command synchronous angular velocity and the calculated command current to the command voltage calculation unit 305.

When the command current and the command synchronous angular velocity are transmitted, the command voltage calculation unit 305 calculates a command voltage (for example, command voltage of the q-axis stator and command voltage of the d-axis stator) based on the command synchronous angular velocity and the command current, which are transmitted, at S612. When the command voltage is calculated, the command voltage calculation unit 305 may convert the calculated command voltage to three phase command voltages (for example, A-phase command voltage, B-phase command voltage and C-phase command voltage) through the voltage conversion unit 310 in FIG. 4, and transmit each of the three phase command voltages to the command voltage correction unit 304 in FIG. 4.

When the three phase command voltages are transmitted, the command voltage correction unit 304 corrects the calculated command voltage to an offset voltage having a magnitude that is equal to or smaller than a driving limitation voltage value for driving the inverter at S613. When the three phase command voltages are corrected to the offset voltages, the command voltage correction unit 304 may transmit the offset voltages to the gating signal generation unit 309 as command voltages corrected.

When the three phase command voltages are corrected to offset voltages and transmitted to the gating signal generation unit 309, the gating signal generation unit 309 generates a gating signal that forces the PWM inverter 104 to drive, based on the command voltages corrected at S614.

When the gating signal is generated, the gating signal generation unit 309 apply the generated gating signal to the PWM inverter 104 at S615.

When the gating signal is applied, the PWM inverter 104 controls the induction electric motor 105 based on the gating signal applied, such that the induction electric motor performs high speed operation at the command speed input already at S616.

On the other hand, although not shown separately, a system of controlling an induction electric motor according to another embodiment of the present disclosure comprises: an inverter for supplying voltage power to the induction electric motor based on a gating signal; first and second vector control units for generating gating signals based on a speed command and a magnetic flux command for a rotor; and a control unit for selecting any one of gating signals generated by first and second vector control units based on a rated speed and the speed command.

That is, compared with the system of controlling the induction electric motor in FIG. 3, the system of controlling the induction electric motor according to another embodiment as mentioned above is, in fact, similar to one shown in FIG. 3, except that the first control vector corresponds to the vector control system 307 and comprises a gating signal generation unit 309 and that the second control vector corresponds to the command voltage output units 304, 305 and 306 and comprises a gating signal generation unit 309.

The first vector control unit calculates current command for the d-axis stator and the q-axis stator based on a difference value between the command speed and the speed of the induction electric motor and a magnetic flux command for the rotor of the d-axis. Then, voltage command for the d-axis stator and the q-axis stator based on the calculated current command for the stator. Subsequently, a gating signal is generated based on the voltage command for the stator.

On the other hand, the second vector control unit calculates voltage command for the d-axis stator and the q-axis stator in a manner similar to the first vector control unit, and then calculates voltage commands for three phases based on the voltage command for the d-axis stator and the q-axis. Then, dynamic over modulation that reduces the magnitude of each of three phase voltage commands is carried out based on the maximum output voltage of the inverter. Subsequently, a gating signal is generated based on the three phase voltage commands modulated.

The control unit supplies a gating signal output from the first vector control unit to the inverter when the speed command is lower than the rated speed, but supplies a gating signal output from the second vector control unit to the inverter when the speed command is higher than the rated speed.

As mentioned above, each of the first and second vector control units calculates the current command for the stator based on the magnetic flux and calculates the voltage command for the stator based on the current command for the stator. That is, since none of the first and second vector control units include an integral operator for calculating the current command for the stator based on the magnetic flux and magnetic flux command of the induction electric motor, any characteristic change due to a proportional gain and an integral gain can be prevented.

In addition, the second vector control unit modulates the voltage commands for three phases so as to have a magnitude smaller than the maximum output voltage of the inverter and generates a gating signal based on the modulated voltage commands for three phases. The control unit supplies the gating signal generated by the second vector control unit to the inverter while it controls the induction electric motor in a high speed region. Therefore, even without regulating the magnetic flux, that is, without a magnetic flux controller, it is possible to prevent control instability due to the fact that output voltage of the inverter in a high speed region is insufficient.

According to the present disclosure discussed above, there is an advantageous effect that flux weakening control can be performed even without a flux controller in a high speed operation region under which the electric motor runs at a speed above a preset rated speed.

It will be apparent by those skilled in the art that various substitutions, modifications and changes to the present disclosure can be made without departing from the technical idea of the present disclosure and thus, the present disclosure is not limited to embodiments as described above and the accompanying drawings.

What is claimed is:

1. A system of controlling an induction electric motor, comprising:
    an input unit configured to receive a command speed for operating an induction electric motor at a high speed above a preset speed;
    a command voltage output unit configured to generate a command voltage for operating an inverter based on the received command speed and configured to output the generated command voltage to the inverter;
    a control unit configured to control the command voltage output unit such that the command voltage output to the inverter is compared with a preset operation limiting voltage and correct the generated command voltage to fall within the preset operation limiting voltage, depending on a result of the comparison;
    a vector control system for receiving the command speed, calculating the command voltage according to the command speed received, correcting the command voltage calculated, through vector control, and outputting the command voltage corrected through the vector control to the inverter; and
    the inverter configured to control the induction electric motor at the high speed depending on the corrected command voltage,
    wherein when the command voltage output to the inverter is determined to be smaller than the preset driving limitation voltage, the control unit allows the command voltage output through the vector control system to go into the inverter and blocks the command voltage output from the command voltage output unit.

2. The system of claim 1, wherein the inverter is configured to control output magnetic flux of the induction electric motor on the basis of the corrected command voltage.

3. The system of claim 1, further comprising when the command voltage output to the inverter is determined to be greater than the preset driving limitation voltage, the control unit blocks the command voltage output through the vector control system and allows the command voltage output from the command voltage output unit to go into the inverter.

4. The system of claim 1, wherein the command voltage output unit comprises:
    a command current calculation unit configured to calculate a command current based on the command magnetic flux, the command speed, the command torque and an output speed, which are transmitted from the control unit;
    a command voltage calculation unit configured to generate the command voltage based on the command current transmitted from the command current calculation unit; and
    a command voltage correction unit configured to convert the command voltage transmitted from the command voltage calculation unit to an offset voltage and configured to output the offset voltage as the corrected command voltage.

5. The system of claim 1, wherein the control unit determines the command speed received as a speed commanding low speed operation when the command speed received is lower than a preset rated speed, while the control unit determines the command speed received as the speed commanding high speed operation when the command speed received is higher than or equal to the preset rated speed.

* * * * *